United States Patent [19]

Coleman, Jr.

[11] Patent Number: 4,480,271
[45] Date of Patent: Oct. 30, 1984

[54] DROPPED SAMPLE DATA RATE REDUCTION SYSTEM

[75] Inventor: Charles H. Coleman, Jr., Redwood City, Calif.

[73] Assignee: Ampex Corporation, Redwood City, Calif.

[21] Appl. No.: 316,978

[22] Filed: Nov. 2, 1981

[51] Int. Cl.³ .............................................. H04N 9/49
[52] U.S. Cl. ....................................... 358/310; 358/13
[58] Field of Search ............... 358/310, 333, 133, 135, 358/138, 12, 13; 364/513

[56] References Cited

U.S. PATENT DOCUMENTS

| | | | |
|---|---|---|---|
| 4,129,882 | 12/1978 | Limb | 358/13 |
| 4,227,204 | 10/1980 | Rossi | 358/13 |
| 4,301,466 | 11/1981 | Lemoine et al. | 358/310 |
| 4,323,916 | 4/1982 | Dischert et al. | 358/13 |

*Primary Examiner*—Richard Murray
*Attorney, Agent, or Firm*—Elizabeth E. Strnad; Joel D. Talcott

[57] ABSTRACT

A method and apparatus are disclosed for eliminating or dropping digital samples from a data stream of samples to reduce the data rate for transmission of the data stream through a transmission channel, such as a data record and reproduce system or the like, and for subsequently reconstructing the original data stream by using the unaltered and recovered digital samples to generate an interpolated value for each of the samples that has been dropped. A finite impulse response multi-term digital filter is used to generate the interpolated value for the samples that have been dropped. Advantages reside in the fact that errors are not propagated during multiple generation recording or transmission, since unaltered sample values are always used to produce the interpolated value for the dropped sample that is being reconstructed. The invention has particular use in video recording and reproducing wherein it is desirable to record a digital data stream at the lowest practicable data rate.

29 Claims, 9 Drawing Figures

DROPPED SAMPLE DATA RATE REDUCTION SYSTEM

This invention generally relates to digital data rate conversion and more particularly relates to a unique method and apparatus for converting a data stream of digital samples from an original data rate to a lower data rate and subsequently converting the lower data rate of digital samples back to the original data rate.

In the field of video or television magnetic recording, there is a trend toward digitizing the video signal and ultimately recording and reproducing digital signals rather than an analog video information signal. Quite obviously, it is necessary to convert the analog signal into the digital domain and this digitizing is typically achieved by sampling the analog signal at a finite sampling rate which must exceed a predetermined minimum sampling rate in order to be able to subsequently obtain the analog signal without significant distortion of signal quality. The minimum sampling rate must therefore satisfy what is generally referred to as the Nyquist criteria. The Nyquist criteria requires a number of samples that is at least double the bandwidth of the signal of interest and for a NTSC color television signal, the minimum acceptable bandwidth is about 4.2 MHz which requires a sampling rate in excess of 8.4 MHz. For the PAL color television system, a bandwidth of 5.5 MHz is required, consequently a sampling rate in excess of approximately 11 MHz. If sampling rates are in excess of these values, then the conversion from the digital domain to the analog domain can be accomplished without incurring distortion.

During the recording of a video signal on magnetic tape, it is also desirable to utilize the least possible amount of tape for economic reasons and it is therefore desirable to have sampling rates that are not significantly in excess of the minimum requirements for this reason. However, it is also desirable for operational reasons to sample a color video information signal such as a NTSC or PAL format signal at some integral multiple of the frequency of the unmodulated color subcarrier frequency, herein referred to as $f_{sc}$. A sampling rate of three times the color subcarrier frequency ($3f_{sc}$) has been commonly used since it is the lowest integral multiple of the color subcarrier frequency that is in excess of the Nyquist criteria. However, a $3f_{sc}$ sampling rate also poses certain operational disadvantages in the recording and reproducing process, generally in color processing, color decoding, and other signal processing operations, that are not specifically related to distortion which may be experienced as a direct result of the selection of a sampling rate that is an odd multiple of the color subcarrier frequency. Because of these operational considerations, it is desirable to use a sampling rate that is four times the unmodulated color subcarrier frequency ($4f_{sc}$), but as should be appreciated, this results in a greater number of samples than is required by the Nyquist criteria to provide faithful data transmission and an undistorted regeneration of the original analog signal and therefore represents some waste in terms of the required transmission channel bandwidth and utilization of the recording medium.

It has therefore been proposed to sample the analog video input signal with a sampling rate of $4f_{sc}$ and then convert the samples obtained to a lower $3f_{sc}$ rate for recording, and upon reproduction, to again convert the $3f_{sc}$ to the $4f_{sc}$ rate. It is also frequently suggested to make the $4f_{sc}$ to $3f_{sc}$ conversion by essentially multiplying by 3 to obtain a $12f_{sc}$ conversion and subsequently dividing by 4 to obtain the $3f_{sc}$ resulting conversion. The conversion may be done in steps, but in any case, basically requires a filtering and interpolation process that calls for the interpolation of at least two samples per subcarrier cycle (a $4f_{sc}$ sample rate would have four samples per subcarrier cycle) in the first conversion and at least the interpolation of three samples in the subsequent conversion from $3f_{sc}$ to $4f_{sc}$. The digital apparatus required to implement this conversion is quite complex and extensive and it has the further drawback that the interpolated samples (which contain filtering errors and quantizing errors) would necessarily be used as the basis for interpolating other samples when the process is repeated as would occur in multiple generation recording. Therefore, these errors would propagate and increase and would eventually introduce uncorrectable errors in the data, nullifying the basic advantage characterizing digital operations.

Accordingly, it is an object of the present invention to provide an improved method and apparatus for converting a digital data stream of a first data rate to a lower data rate for the purposes of transmission through an information channel and for subsequently converting the lower data rate back to the higher first rate upon receipt of the transmitted data stream transmitted through the information channel.

Another object of the present invention is to provide a method and apparatus for accomplishing the above-described conversions in a manner whereby errors that may be introduced into the data streams by the conversions will not propagate and increase during multiple generation data recording or transmission.

Still another more detailed object of the present invention is to provide a method and apparatus for converting the sample rate of a video information signal from an original sample rate of four times the frequency of the unmodulated color subcarrier ($4f_{sc}$) to a lower rate of three times the frequency of the color subcarrier ($3f_{sc}$) for recording or the like and for subsequently converting the lower sample rate back to the four times color subcarrier frequency which is achieved in a unique manner whereby the first conversion from $4f_{sc}$ to $3f_{sc}$ is accomplished by merely dropping or removing one sample per subcarrier cycle and the second conversion is accomplished by applying the unaltered samples of the $3f_{sc}$ sample rate data stream to a digital filter which generates an interpolated value for insertion into the data stream at the location of each previously dropped sample to thereby reconstruct the data stream at the $4f_{sc}$ data rate.

Other objects and advantages will become apparent upon reading the following detailed description, while referring to the attached drawings, in which.

Broadly stated, the present invention is directed to a method and apparatus for converting a digital data stream of one data rate to a second lower data rate which is done simply by dropping or discarding data samples or data words from the data stream at predetermined and constant intervals. The remaining unaltered data words of the data stream are then preferably reordered or reclocked into uniformly spaced data words at the second lower data rate. After recording and reproducing or transmission through a transmission channel, the lower data rate data stream is subsequently converted back to its original form by inserting into the data stream an interpolated value for each of the dropped data words by using a digital filter which operates on the unaltered samples to generate interpolated values and inserts the interpolated values into the data stream between unaltered samples at the locations where samples had previously been dropped.

The present invention is particularly adapted for use in digitizing a color video signal, for example, to form a digital data stream and reducing the number of samples by dropping selected samples from the data stream for the purpose of recording on a magnetic media and during subsequent reproducing, reconstructing the original digitized color video information signal by using the unaltered recorded data samples and providing an interpolated value for each of the samples that had been dropped prior to the recording. Of particular advantage is the fact that the digitized data stream that will be recorded will always consist of unaltered data words if the data words that are dropped are always at the same locations when the process is repeated. Thus, if a digital data stream of data words comprises samples that were taken at a $4f_{sc}$ rate and the samples are converted to a $3f_{sc}$ data rate by dropping every fourth sample, it should be appreciated that the three remaining of every four samples are unaltered or noninterpolated and these data words can be recorded and subsequently reproduced and utilized to generate the interpolated value that is inserted between the unaltered samples for reconstruction of the digital data stream. If the interpolated value is subsequently dropped during a subsequent recording, i.e., a multiple generation recording, there will be no propagation or increasing of any errors, since the data samples that are remaining for subsequent recording and reproducing will always be unaltered and therefore available without distortion for use in generating the interpolated value for the original dropped sample during reconstruction of the digital data stream at the original $4f_{sc}$ data rate. However, it can easily be appreciated that interpolation errors would necessarily propagate through multiple generation recordings if different samples were dropped during the subsequent conversion because interpolated values would in turn be used to interpolate other values.

Figure 2:
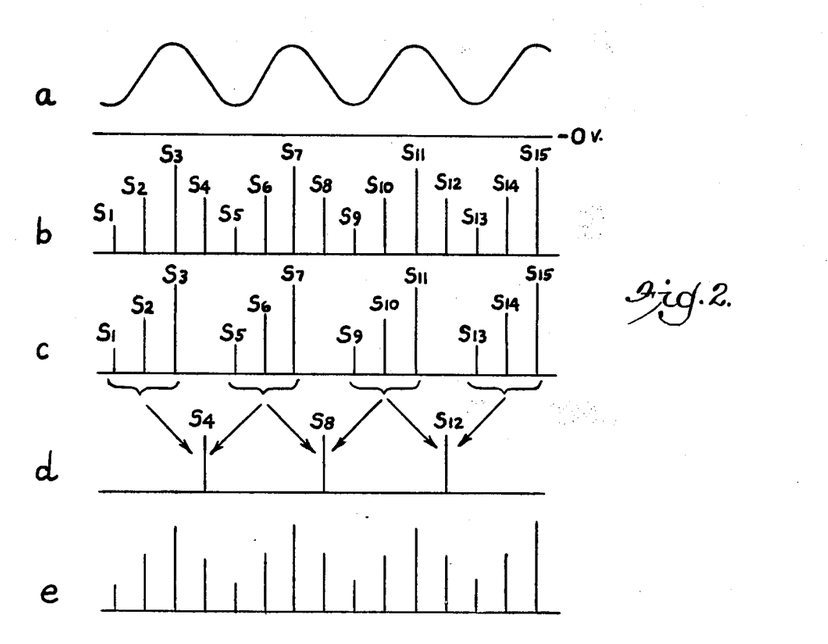
FIGS. 2a–2e are waveforms that are useful in describing the operation of the present invention.

Turning now to the drawings and particularly FIG. 2, the general scheme of the present invention can be more readily appreciated from an examination of the waveforms of FIG. 2 which illustrate the conversion scheme for converting a $4f_{sc}$ digitized data stream to a $3f_{sc}$ data stream and subsequently reconstructing the $4f_{sc}$ data stream. Referring initially to FIG. 2a, there is shown, for example, several cycles of an unmodulated color subcarrier waveform of a color video information signal superimposed upon a low frequency, or D.C. component. FIG. 2b illustrates sampling the FIG. 2a waveform at a sampling rate of $4f_{sc}$. The vertical lines in FIG. 2b therefore represent the magnitude of the signal of the FIG. 2a waveform at the times indicated.

More particularly, sample $S_1$ shown in FIG. 2b has the same amplitude as the trough of the waveform shown in FIG. 2a, sample $S_3$ has an amplitude corresponding to the crest of the waveform in FIG. 2a and samples $S_2$ and $S_4$ are generally midway between the crest and troughs as shown. If the amplitudes of the various samples are taken and held by a sample and hold circuit and thereafter digitized by an analog-to-digital converter, then digital word representations of the samples will be produced which can be subsequently recorded or transmitted through an information channel. It should be appreciated that a sample rate of $4f_{sc}$ is greatly in excess of that required by the Nyquist criteria, and in accordance with the present invention, it is desired to reduce the number of data words that are to be recorded on a recording media or transmitted through a transmission channel and this can be accomplished by merely dropping one of the four samples per subcarrier cycle which is illustrated in FIG. 2c. Thus, in the first subcarrier cycle, samples $S_1$, $S_2$ and $S_3$ remain while sample $S_4$ has been dropped, and samples $S_5$, $S_6$ and $S_7$ also remain while sample $S_8$ is dropped, this sequence occurring throughout. It is preferred that the remaining samples be reclocked or reordered in a manner that is uniform, i.e., at a rate corresponding to three samples per subcarrier cycle, so that a uniform data rate will be provided and no gaps will be present where samples had previously been located. By viewing the samples shown in FIG. 2c, it should be appreciated that the gaps between samples $S_1$ and $S_2$ or $S_2$ and $S_3$, for example, represent the $4f_{sc}$ sampling rate which is well in excess of the Nyquist criteria, but that the gap between samples $S_3$ and $S_5$ would, if repeated on a uniform basis, represent a rate of $2f_{sc}$ which is below the Nyquist minimum. However, for each cycle of subcarrier, there exist three samples, therefore making the average sampling rate $3f_{sc}$, which is still in excess of the Nyquist minimum. As is evident from the above description in conjunction with FIG. 2, one sample is dropped each subcarrier cycle in effectively converting the $4f_{sc}$ data rate to a $3f_{sc}$ data rate and this is the embodiment of the invention that is described in detail herein. It should be appreciated that other embodiments are possible and feasible. For example, with a $4f_{sc}$ input data rate, it is possible to drop one sample out of every three samples, rather than one sample out of every four, which therefore involves dropping more than only one sample per subcarrier cycle. If every third sample is dropped, it would convert the data rate to a data rate of $2\frac{2}{3}f_{sc}$, which is also within the scope of the present invention.

By virtue of the present invention, a digital filter can be used to reconstruct or interpolate the previously dropped sample and thereby reconstruct the original waveform upon reproducing or upon receipt through a transmission channel. Thus, when using the particular digital filter shown in FIG. 1, sample $S_4$ has been reconstructed using samples $S_1$-$S_3$ and $S_5$-$S_7$. Similarly, sample $S_8$ is reconstructed using samples $S_5$-$S_7$ and $S_9$-$S_{11}$. Other succeeding samples are similarly reconstructed using the adjacent unaltered samples in a similar manner. With a digital filter employed other than the one shown in FIG. 1, different combinations of nearby samples might be used to reconstruct the dropped sample. With the interpolated samples $S_4$, $S_8$, $S_{12}$, etc., inserted into the data stream, the original unaltered data stream is thereby reconstructed as shown in FIG. 2e and only every fourth sample represents an interpolated value. If the samples shown in FIG. 2e are again processed for recording or transmission through a transmission channel in a similar manner, it should be appreciated that errors will not propagate or be compounded if the reconstructed samples are dropped, i.e., samples $S_4$, $S_8$, $S_{12}$, etc., in the illustrated embodiment.

Figure 1:
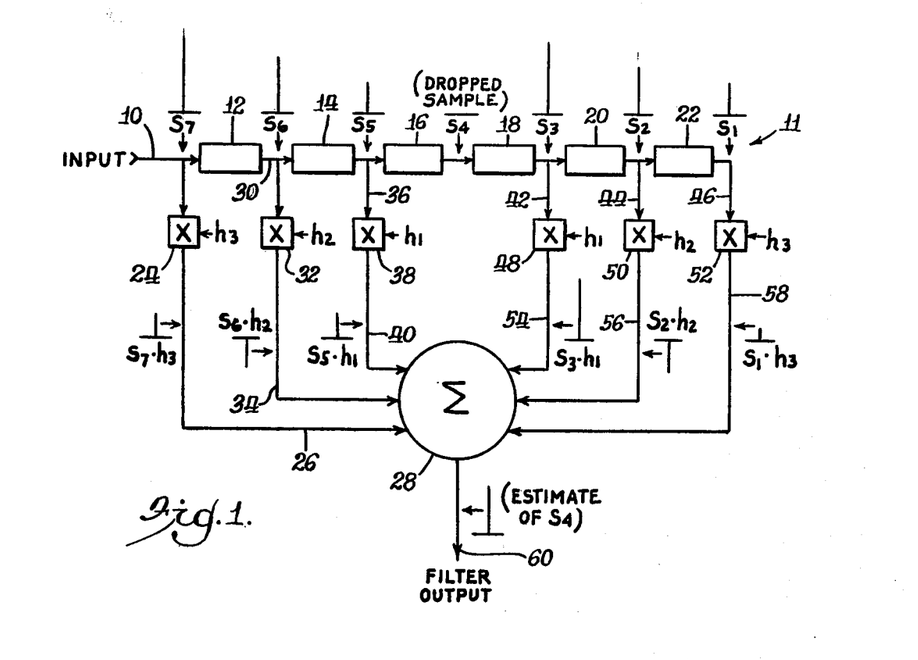
FIG. 1 is a functional block diagram of a digital filter which may be used to carry out one aspect of the present invention.

In accordance with an important aspect of the present invention, the interpolation of the value of the reconstructed sample is made by a digital interpolating filter of unusual form and which belongs to the F.I.R. (Finite Impulse Response) class. The filter can employ two or more nonzero terms, with an increasing number of terms providing more accurate frequency response over the frequency of interest. The word "term" as used is intended to mean a pair of identical coefficients in the filter design. It should be appreciated that a larger number of terms increases the complexity and cost of the digital filter. This is compounded by the fact that it is contemplated that for applications such as commercial broadcast quality television signals, for example, each sample word will have eight bits of digital information which means that individual drop sample, interpolation and interpolated sample insertion circuit components must be provided for each of the eight bits of the sample word. In this regard, it has been found that a digital filter of three terms provides adequate response at the frequencies of interest for a color television signal and even a digital filter of two terms has been found to be adequate for noncritical applications. It is preferred that the operation of the digital filter be such that the samples are continuously read into the digital filter and the filter output only being used at the times when a dropped sample would be located at a center tap position. This can be more fully understood in conjunction with the block diagram of FIG. 1 which has an input line 10 (actually comprising eight lines of parallel data) to a shift register 11 to which the samples are continuously applied and in the illustrated drawing, there is shown a number of stages 12, 14, 16, 18, 20 and 22 through which the samples are shifted in a generally continuous manner. It is shown that seven samples, one of which is a dropped sample, have been applied to the digital filter with the magnitude of their values being substantially similar to those shown in FIG. 2c as previously explained. The dropped samples' value is actually immaterial since its original value was discarded, and in the filter its time slot in the data stream may be occupied by anything, since that time slot is ignored. The dummy value can be zero, or as is most practically convenient, it is a repeat of the immediately preceding sample, as will be described hereinafter. Thus, the sample $S_1$ appears at the output of stage 22 when sample $S_2$ appears at the output of stage 20 and the other samples correspondingly are present generally at the positions shown in the drawing. It is reiterated that the block diagram of FIG. 1 illustrates a single line and that the sample outputs will actually comprise an eight bit binary word, each bit of which would be clocked through the stages of the digital filter.

The outputs of each stage are used in generating the interpolated value of the dropped sample. More particularly, the input line 10 to the stage 12 is also applied to a multiplier 24 which has a multiplying coefficient $h_3$ to provide an output on line 26 that is applied to a summing circuit 28. Similarly, the output of stage 12 appearing on line 30 is applied to the stage 14 as well as to a multiplier 32 which has a multiplying coefficient $h_2$ that provides an output on line 34 that also extends to the summing circuit 28. In a similar manner, the output of stage 14 appears on line 36, which is applied to stage 16 as well as to a multiplier 38 having a multiplying coefficient $h_1$ to provide an output on line 40 that is extended to the summing circuit 28. Also, the outputs of stages 18, 20, 22 appear on respective lines 42, 44, 46 which extend to the associated multiplying circuits 48, 50 and 52 which have the illustrated multiplying coefficients that provide outputs on respective lines 54, 56 and 58, all of which also extend to the summing circuit 28.

Figure 3:
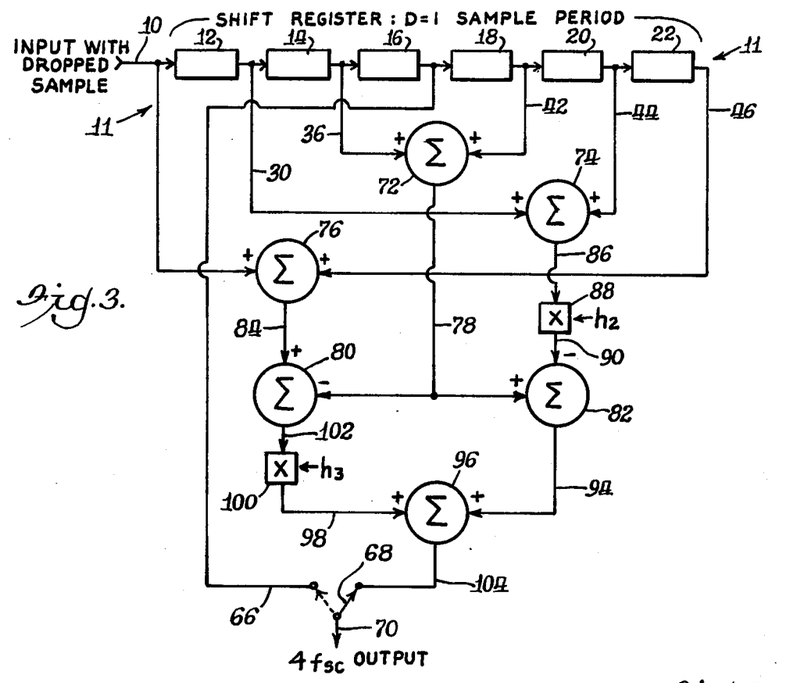
FIG. 3 is an equivalent functional block diagram of the digital filter shown in FIG. 1, given particular digital filter multiplying coefficients that are preferred in practicing the present invention.

The output of the summing circuit 28 which is the arithmetic sum of all its input signals appears on line 60 which provides the interpolated value for the dropped sample. If the unaltered samples that are being clocked through the shift register are used except where a dropped sample had previously been located, then when the sample is to be inserted, a suitable switch (such as illustrated in the filter of FIG. 3) will switch the output of the digital filter to insert the interpolated value in the location in the data stream where a dummy or repeated sample had been provided and whose value was totally irrelevant and incorrect. It should be appreciated that the interpolated value must be taken from the digital filter when the dropped sample location is in the center position, i.e., where sample $S_4$ would have been located in the block diagram of FIG. 1.

For the digital filter to optimally perform, it should be understood that certain conditions are necessary. For the application where data at a $4f_{sc}$ data rate is converted to a uniform $3f_{sc}$ rate and subsequently reconstructed back to the $4f_{sc}$ data rate, the filter has additional requirements in that all of the multiplying constants or coefficients corresponding to taps or sample locations corresponding to the center or zero position as well as positions that are integral multiples of four away from the zero position, i.e., at locations $-8$, $-4$, 0, 4, 8, etc., also have values equal to zero. Since a linear phase response is wanted, the other coefficients have finite values that are grouped in equal pairs, with each tap or sample location of a pair being equidistant from the center, i.e., the coefficient for multiplying on each side of the center of the digital filter will be the same for each position away from the center position.

Except for quantizing effects, the filter will make a perfect estimate and therefore replace the missing sample if two conditions are met. The first is that all samples must be true linear representations of the bandlimited input signal, when sampled at the original $4f_{sc}$ rate. Thus, for example, the analog-to-digital converter which provides the samples at the $4f_{sc}$ sample rate should always operate within its range of conversion. In other words, if the analog input signal exceeds the range of the A-to-D converter, then the digital signal would not be a true indication of the analog input, i.e., the A-to-D converter would have limited it. In such event, the digital signal would be incorrect and would necessarily detrimentally affect the operation of the filter and would provide an incorrect interpolated value. In other words, the input signal and A-to-D converter must operate so that the resulting samples are the digital equivalent of a linear process. The second condition is that the filter, when measured linearly, i.e., when all the samples are present in the measuring signal, has a response characteristic of unity at all frequencies in which the sampled analog signal has energy. Since a color video information signal has a larger concentration of energy at two distinct areas, i.e., at the low frequency and particularly the D.C. level and at the subcarrier frequency, the filter should have a unity response at these frequencies and the choice of coefficients for a filter can be chosen to provide exactly unity response at these frequencies of interest as well as others, depending on the number of terms. In this regard, reference is made to FIG. 4 which shows a graph of a frequency response versus frequency for a three term filter shown by the curve indicated at 62 and also for a five term filter shown by the curve indicated at 64. Of particular interest is the fact that the response is unity at the subcarrier frequency and also at zero frequency as is desired with both of the filters. This is accomplished by determining the coefficients to obtain this response characteristic.

Figure 4:
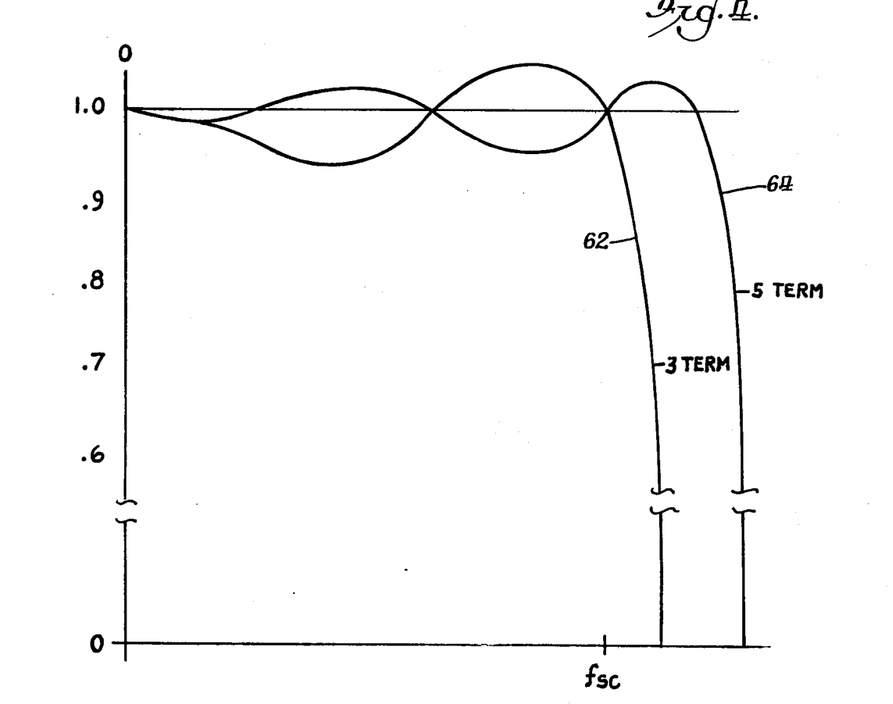
FIG. 4 illustrates graphs of the response versus frequency characteristic of a 3 term filter and of a 5 term filter.

In general, the bandwidth and flatness of the frequency response of a digital filter is a function of the number of coefficients used and therefore of the filter complexity. By comparing the two response lines 62 and 64 for a three term and five term filter, it can be seen that the five term filter generally has a flater response through the entire frequency range of zero through the subcarrier frequency and the bandwidth is slightly wider than the three term bandwidth. For the application of a digital filter in reconstructing dropped samples wherein the samples are samples of a color video information signal, the three term filter performs adequately and any response errors that occur elsewhere in the passband are within acceptable limits. If the samples are from an information signal wherein the departure from unity response within the passband must be held to smaller amounts, then a more complex and therefore more expensive digital filter may be required to be compatible with the operational requirements. In practice, for a three term filter which is used to provide an interpolated value of a dropped sample where the information signal is a color video information signal, the coefficients of $h_1$ equaling 27/32, $h_2$ equaling $-\frac{1}{2}$ and $h_3$ equaling 5/32 have been found to have satisfactory performance for most purposes. These coefficients provide the unity response at the subcarrier frequency and at zero frequency and are determined using techniques that are well known to those of ordinary skill in the art of digital filter design.

Thus, returning to FIG. 1, it is seen that the $S_7$ sample value which appears on line input 10 is multiplied by the $h_3$ coefficient of 5/32, as is the value of sample $S_1$ appearing on line 46, and a smaller sample value is generated that is applied to the summer circuit 28 from the output of the multipliers 24 and 52. Similarly, the $S_6$ sample value on line 30 and the $S_2$ sample on line 44 are multiplied by the $h_2$ coefficient of $-\frac{1}{2}$ by the respective multipliers 32 and 50 to provide negative smaller sample values that are similarly applied to the summer 28. Finally, the values of samples $S_5$ and $S_3$ appearing on lines 36 and 42, respectively, are multiplied by the $h_1$ coefficient of 27/32 by the respective multipliers 38 and 48 output levels and the resulting multiplied sample values are also applied to the summer 28 via lines 40 and 54.

The digital filter shown in FIG. 1 can be reorganized to produce an equivalent structure having less complexity and such an equivalent circuit is shown in FIG. 3 together with a switch for applying the output of the digital filter into the data stream where the dropped sample had been previously located. Circuit elements in the digital filter embodiment of FIG. 3 corresponding to circuit elements of the embodiment of FIG. 1 are identified by like reference numbers. In the embodiment of FIG. 3, the input 10 is coupled to the multi-stage shift register 11 having serially coupled stages 12, 14, 16, 18, 20 and 22 with output lines 30, 36, 42, 44 and 46, as well as an output line 66, which is the center tap and is applied to an output switch 68 that operates to either select the output of the filter or the data samples that are being shifted through the shift register stages. Thus, the switch 68 will select the data samples from line 66 during the times when unaltered samples are being clocked through the shift register and will be switched to the right as shown in FIG. 3 to insert the interpolated value of the dropped sample into the data stream and regenerate the $4f_{sc}$ data stream in the manner as has been described with respect to FIG. 2. With regard to the timing and shifting of the data through the shift register, it should be appreciated that the clock rate for shifting the data into the shift register at line 10 is such that the data words are at the converted or $4f_{sc}$ rate and a gap or dummy word is supplied at those times where the output of the digital filter is used to replace the previously dropped sample. The line 70 from the switch 68 will therefore have an interpolated sample value inserted between the unaltered samples that are being clocked through the shift register and will therefore provide a uniform data stream that includes the same number of data words as the original data stream.

The equivalent digital filter shown in FIG. 3 takes advantage of the fact that each of the coefficients is used to multiply two separate digital words and therefore the outputs on opposite sides of the center tap of the shift register can be and are applied to separate adders to reduce six lines to three lines. Thus, lines 36 and 42 coupled to the taps immediately adjacent the center tap line 66 are applied to an adder 72 while the next adjacent taps from the center tap coupled to lines 30 and 44 are applied to an adder 74 and the third adjacent opposite taps are coupled to lines 10 and 46, which are applied to a third adder 76. The output of the adder 72 is on line 78 and is applied to a first negative input of a subtractor 80 as well as to a first positive input of an adder 82. The output from adder 76 appears on line 84 and is applied to a second positive input of the subtractor 80 while the output of the summer 74 appears on line 86 which is applied to a multiplier 88, whose output in turn is coupled by line 90 to the second negative input of adder 82. The output of adder 82 appears on line 94 and is applied to a first input of yet another adder 96, which has a second input coupled to the output line 98 extending from a multiplier 100. The multiplier 100 multiplies the output of the subtractor 80 appearing on line 102 by the coefficient $h_3$. Since the sum of the coefficients $h_1$ and $h_3$, i.e., 5/32 and 27/32 equals 1, the arithmetic processing of the sample values $S_3$ and $S_5$ in the manner performed by the digital filter embodiment of FIG. 3 permits the desired interpolation to be performed with only two multipliers instead of the three multipliers needed in the embodiment of FIG. 1. Furthermore, in the embodiment of FIG. 3, multiplication by a coefficient of $h_2 = -\frac{1}{2}$ is accomplished by first multiplying the value of the sample sum $S_2 + S_6$ by $+\frac{1}{2}$ and thereafter subtracting the multiplied sample value from the other sample values being combined to form the interpolated sample value.

The input line 10 is provided with the unaltered samples together with an interval or space for insertion of a previously dropped sample so that unaltered samples occur at three successive locations in the data stream and the space occurs at the location where the interpolated value for the previously dropped sample is to be inserted. When the dropped sample interval reaches the center tap of the shift register, i.e., at the output line 66 from the stage 16, then the switch 68 is switched to the right to obtain the interpolated sample value from the digital filter. After the interpolated sample value has been inserted in the data stream, the switch 68 is then switched back to the leftward position so that the unaltered sample values appearing on line 66 will be provided at the output 70 of the switch 68. In this manner, the reconstructed $4f_{sc}$ data stream will be provided as is desired.

Figure 5:
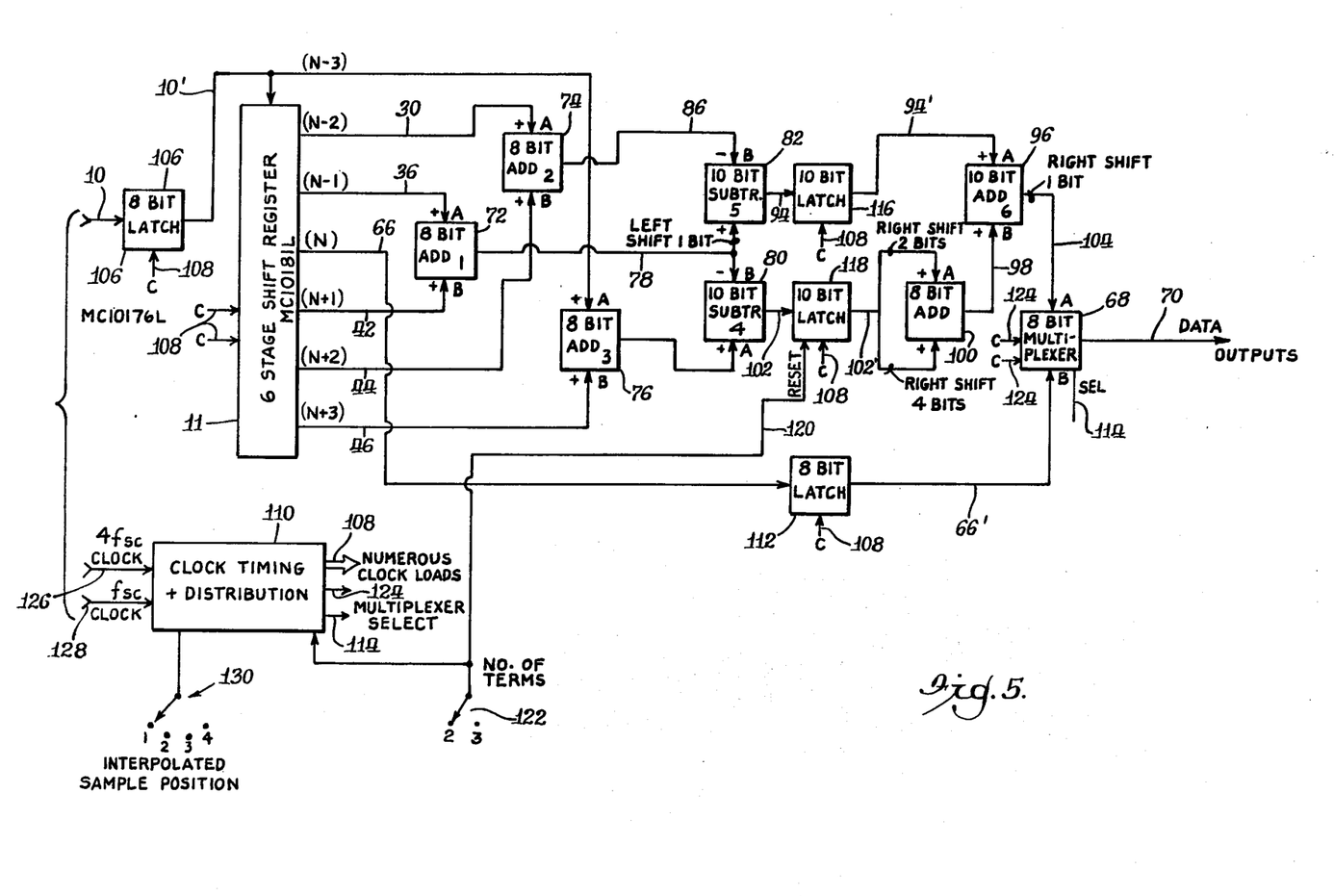
FIG. 5 is a simplified electrical schematic diagram of circuitry that can be used to implement the functional block diagram of FIG. 3.

To implement the block diagram of the equivalent circuitry shown in FIG. 3, reference is made to a more detailed block diagram shown in FIG. 5 which has a number of integrated circuits that are interconnected as shown. While each individual line for each bit is not shown in detail, those of ordinary skill in the art can easily connect the integrated circuit chips together to build the illustrated circuitry. In this regard, like reference numbers identify like components in the embodiments of FIG. 3 and FIG. 5. Returning to the detailed block diagram of FIG. 5, it is also noted that an 8 bit latch 106 is coupled to receive the digital data present at the input 10 and the output of the latch is identified as line 10' since it is essentially still the input to the remaining part of the digital filter circuitry. The latch 106 reclocks the data that is received at input 10, the reclocking effected by a clock signal on line 108 that is generated by clock timing and distribution circuitry 110 shown to the bottom left of the diagram of FIG. 5. Moreover, the output line 66 of the shift register 11, i.e., the center tap line of the shift register, is applied to an 8 bit latch 112, which is also clocked by line 108. The output of the latch 112 is identified as line 66' which carries the reclocked data to the switch 68, which is actually an 8 bit multiplexer as shown. A select line 114 controls the operation of the multiplexer 68 and originates from the clock timing and distribution circuitry 110. The latch 112 is used to match the delay (of one clock period) introduced by the latches 116 and 118. The latches 116 and 118 are used to realign the data and is necessitated by the variable propagation delays of preceding adders and subtractors.

The actual circuit implementation of the multipliers $h_2$ and $h_3$ is accomplished by the manner in which the interconnections are made of the lines between the integrated circuits. More particularly, the multiplication of the 8 bit digital word by $\frac{1}{2}$ can be accomplished by shifting all digits one bit to the right (toward the lesser significant digits). Similarly, multiplying the digital word by the fraction 5/32 is equivalent to multiplying by $\frac{1}{8}$ and adding that result to the result of multiplying by 1/32. Since a $\frac{1}{8}$ multiplication can be accomplished by shifting all digits three bits to the right and a 1/32 multiplication can be done by shifting all digits five bits to the right, a 5/32 multiplication is done by performing these steps and adding the respective results. In the actual circuitry of FIG. 5, the output line 102' is split and one set of lines is shifted two bits right before being connected to the adder 100, while the other set of lines is shifted four bits to the right and both shifted sets are then added by the adder 100. This result is in turn applied by lines 98 to adder 96. The multiplication by $h_2(-\frac{1}{2})$ is accomplished in the following manner. The signal on line 86 is fed to the (−) input of subtractor 82 without shift. The other (+) input is fed signal 78 shifted left (upwards) by one bit. The filter output on line 104 is shifted right (downwards) by one bit. The overall result of these steps is the same as if 86 had been shifted right one bit and no shifts applied to 78 and 104. This equivalent right shift by one bit of 86 is the same as multiplying it by $\frac{1}{2}$. Since $-\frac{1}{2}$ is wanted for $h_2$, the change of sign is achieved by using a subtractor 82. The output lines 104 of adder 96 are shifted one bit to the right upon connection to multiplexer 68 to obtain the final shift and correct result. The overall result is that a multiplication by $h_3(5/32)$ is applied to signal 102. Thus, in the above manner the multiplication by the multiplying coefficients is relatively easily carried out.

The data appearing on line 94 is reclocked by the latch 116 and is therefore present on line 94' which is applied to the adder 96 and the subsequent right shift of the data on lines 104 extending to the multiplexer 68 completes the process of applying coefficients $h_2$ and $h_3$ to their respective appropriate signals by means of shifts and additions.

The latches that are utilized in the circuitry of FIG. 5 are of conventional design and can be made up from two integrated circuits, type No. 10176L and the six stage shift register 11 can be made up from a number of the same integrated circuits connected as a shift register. The 8 and 10 bit adders and subtractors shown in the drawing are preferably made up from conventional integrated circuits commonly known as Arithmetic Logic Units which can be connected as adders or subtractors by suitably connecting the control pins in a well known manner and these devices may be integrated circuit type Ncs. 10181L and 10182L or other comparable devices.

The clock timing and distribution circuitry 110 also has clock lines 124 for clocking the multiplexer 68, the clock signal on this line being somewhat delayed relative to the clock signals on lines 108 to insure proper timing and the circuitry 110 also has an input clock signal of $4f_{sc}$ on input line 126 as well as a subcarrier frequency clock signal applied to line 128. The circuitry 110 also includes a switch 130 which is used to select which of the four samples of each subcarrier cycle that is to be interpolated. In this regard, it should be appreciated that the sample that is to be interpolated should always be in the location where the sample had been previously dropped. In a commercial circuit it is contemplated that a standard uniformly positioned sample would be dropped for all video signals and it has been found that virtually any one of the four samples per subcarrier cycle can be dropped with generally equal results in terms of quality upon reconstruction. In other words, it has been found not to matter which of the samples is dropped during operation.

Figure 6:
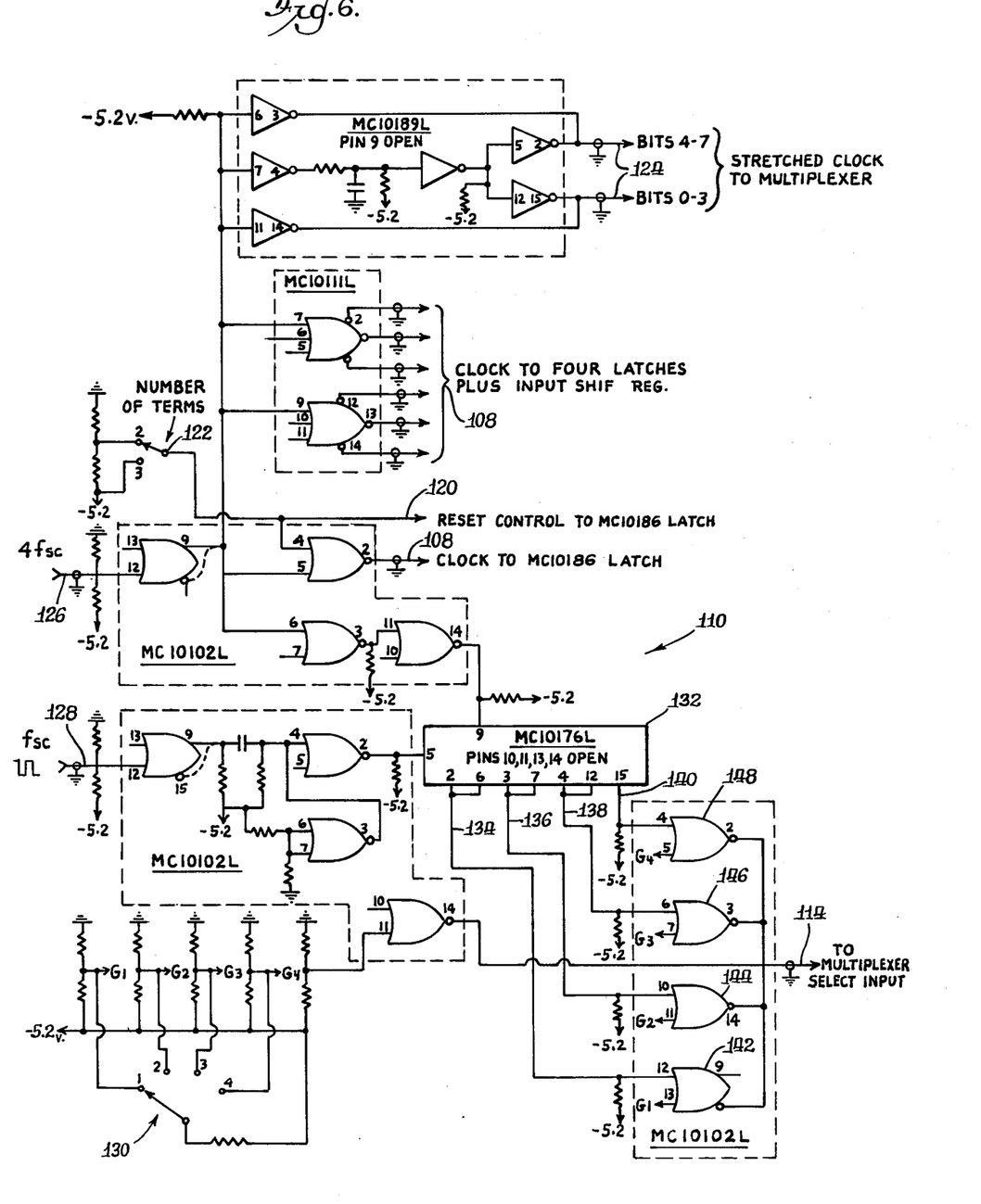
FIG. 6 is an electrical schematic diagram of clock generation and distribution circuitry that is used in conjunction with the circuitry of FIG. 5.

The clock timing and distribution circuitry 110 shown in FIG. 5 is illustrated in more detail in FIG. 6 where identical reference numbers identify the various clock lines and switches that are shown in FIG. 5. More particularly, the $4f_{sc}$ clock on line 126 as well as the subcarrier frequency clock on line 128, both of which are of square wave form, are applied to integrated circuits as shown in the dotted lines and these are distributed through logic gates to provide the clock signals on lines 108 and 124 as shown. The $4f_{sc}$ and subcarrier frequency signals are applied to a shift register 132 which has output lines 134, 136, 138 and 140 respectively connected to NOR gates 142, 144, 146 and 148, the other inputs to which are supplied by the switch 130. Depending upon which of the numbers is selected, the switch 130 will enable one of the gates 142 through 148 so that the output select line 114 will be active at either the first, second, third or fourth sample within the subcarrier cycle. It should also be appreciated that if standardization is achieved so that the same sample within the subcarrier cycle is always reconstructed, then the circuitry shown in the lower portion of FIG. 6 could be greatly simplified as would be evident to one of ordinary skill in the art.

Figure 7:
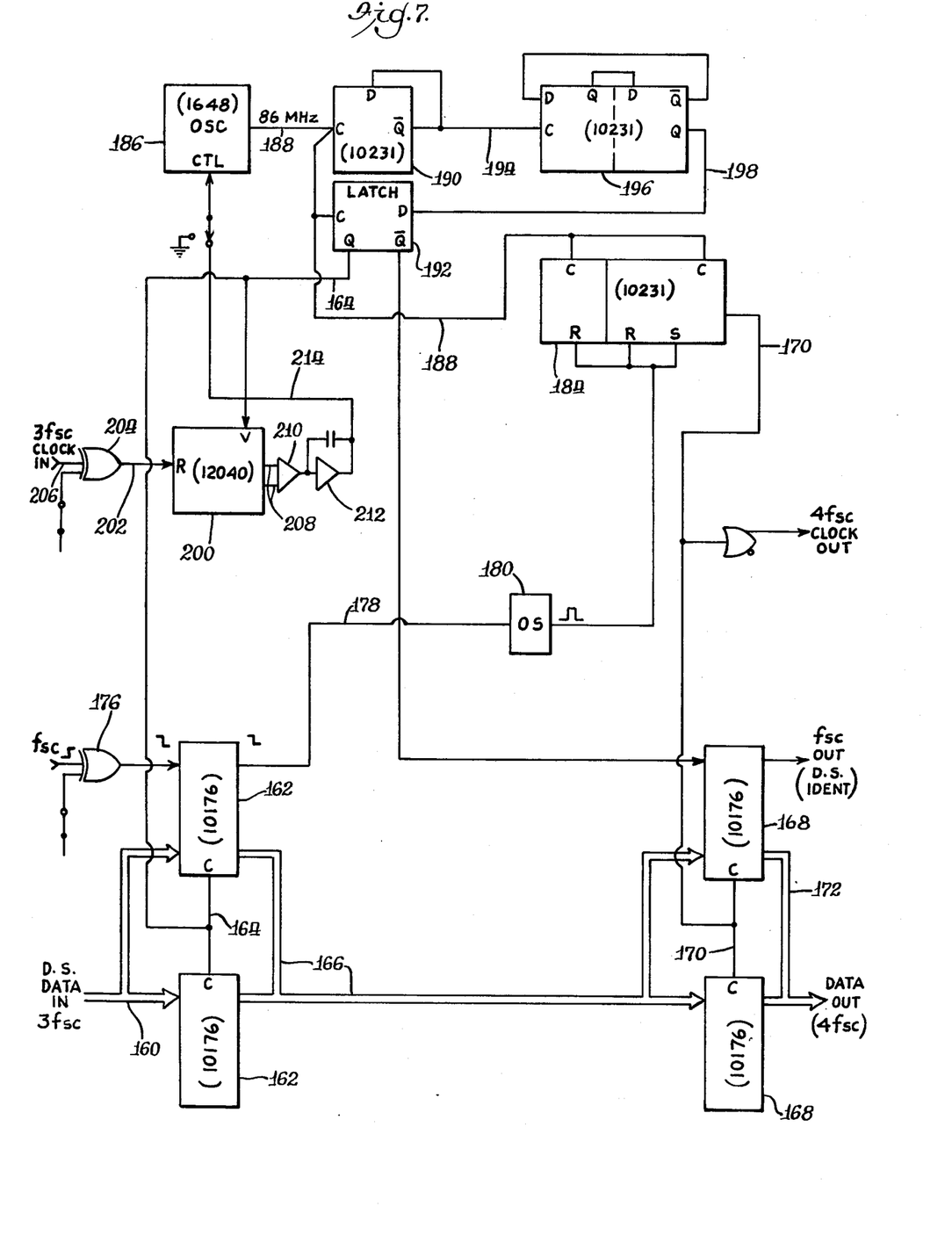
FIG. 7 is an electrical schematic diagram of circuitry which can be used to insert a repeated sample after every third sample and also reclock the data stream from a $3f_{sc}$ data rate to a $4f_{sc}$ data rate.

The data stream that has been sampled at a $4f_{sc}$ rate has every fourth sample removed to thereby provide a $3f_{sc}$ data stream which can be either recorded or transmitted through an information channel. When the data stream is received upon reproducing in the case of the information having been recorded or merely received if transmitted through an information channel, the data in the $3f_{sc}$ data stream is preferably converted to the $4f_{sc}$ data rate and a gap or dummy sample is provided in the data stream at each location where a sample had been previously dropped so that the digital filter, such as that shown in FIGS. 3 and 5 can properly operate. As previously mentioned, it is easier as a practical matter to repeat a previous sample in the location where a sample had been dropped rather than provide a gap, although either is permissible, since the value of the repeated sample or gap is ignored anyway, and the output of the digital filter is used for inserting the interpolated sample value from the neighboring samples that are unaltered. Circuitry which accomplishes the reclocking of the data to provide the $4f_{sc}$ data rate data stream and with a repeated sample present at each location where a sample had been previously dropped is shown in FIG. 7 which will be explained in conjunction with the timing diagrams of FIG. 8. It will also be apparent from the following description that the circuitry of FIG. 7, when modified in a manner that will be subsequently described, will drop every fourth sample and also reclock the $4f_{sc}$ data stream to a data rate of $3f_{sc}$ with no gaps or spaces therein. The manner in which a sample is repeated and the data stream reclocked can best be understood from the timing diagrams of FIG. 8, and the manner in which a sample is dropped and the data stream reclocked from $4f_{sc}$ to $3f_{sc}$ can be readily understood from the timing diagrams of FIG. 9.

Figure 9:
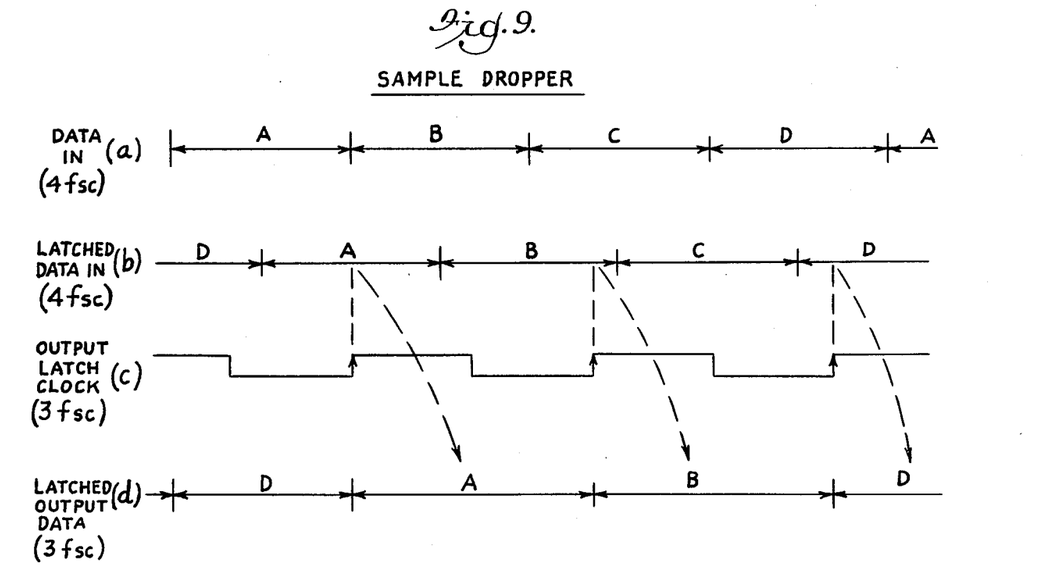

Turning initially to the sample dropper timing diagrams of FIG. 9, FIG. 9a shows the data of the data stream being presented to the circuitry which will be described. The samples per subcarrier cycle are present and are illustrated as data words A, B, C and D. When the input latch is clocked, the data is latched in at the clock time as shown in FIG. 9b. The output of the input latch is applied to a second output latch and it is clocked at a different clock rate which is at a $3f_{sc}$ rate, with the clock timing being synchronized so that the output latch is clocked in the manner as shown in FIG. 9c, i.e., at each of the positive-going transitions shown in FIG. 9c. When latched, the data that is presented to the latch appears at its output which results in a $3f_{sc}$ rate and a sample being dropped during each subcarrier cycle. Thus, one data word out of each four is dropped which, in the illustrated embodiment of FIG. 9, results in sample C being dropped, the output produced resulting in data words A, B and D being present at a $3f_{sc}$ rate as shown.

Figure 8:
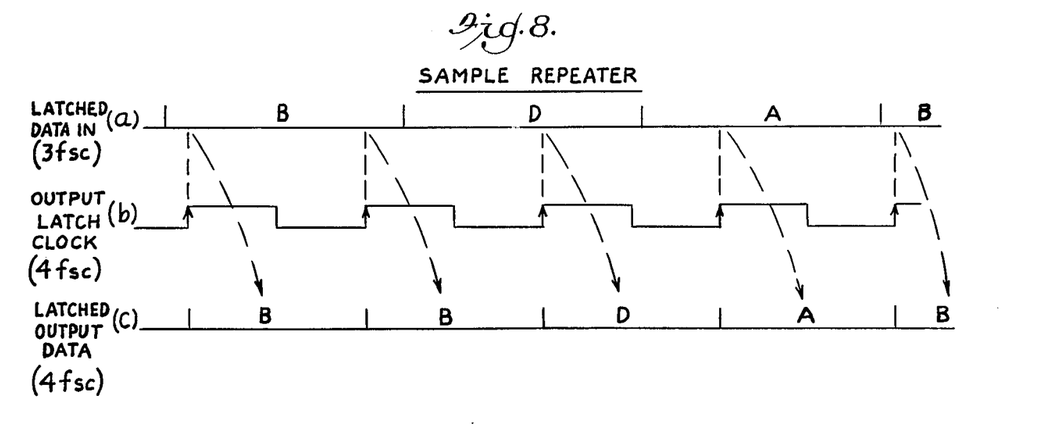
FIGS. 8a, 8b and 8c represent timing diagrams for the sample repeater circuitry shown in FIG. 7; and, FIGS. 9a, 9b, 9c and 9d are timing diagrams for circuitry similar to that shown in FIG. 7 for dropping every fourth sample from a $4f_{sc}$ data rate data stream and for converting a $4f_{sc}$ data rate to a $3f_{sc}$ data rate data stream.

Turning now to the timing diagrams for the sample repeater shown in FIG. 8, the $3f_{sc}$ data rate data stream is applied to the circuitry shown in FIG. 7. The data stream includes the data words A, B and D and a $4f_{sc}$ clock is used to latch in the input data into an input latch as shown in FIG. 8b, wherein the positive-going transition of the $4f_{sc}$ clock clocks the latch and thereby latches in the data that is present at the time of the transition. As shown in FIG. 8c, there are two positive-going transitions of the clock when word B is present at the input latch which results in a repeating of the data word B followed by a single latching of data word D and A. This results in a $4f_{sc}$ data rate data stream being applied to the digital filter and the second occurrence of the word B is ignored and the output of the digital filter applied to provide the reconstructed data word C that had been dropped by the sample dropper circuitry previously described with respect to the timing diagrams of FIG. 9.

Turning now to the specific circuitry that can accomplish the sample repeating operation described with respect to FIG. 8, $3f_{sc}$ data stream is presented on input line 160 which actually comprises 8 lines, each of which carries one bit of the 8 bit word of the data stream. The line 160 is connected to the inputs of latches 162 which are clocked by a clock signal on line 164 that is occurring at a clock rate of $3f_{sc}$, i.e., the rate of the input data on line 160. The clock on line 164 is appropriately timed so that the data is present and stable at the input of latches 162 before it is clocked into them. The data that is clocked into them appears on output line 166 and is occurring at a $3f_{sc}$ data rate. Line 166 is coupled to the input of another set of output latches 168 that are clocked by a clock signal on line 170 which is at the clock rate of $4f_{sc}$ as shown in FIG. 8b, so that the data that appears on the output line 172 of the latches 168 is as shown in FIG. 8c. The clock signal on line 170 is at the $4f_{sc}$ rate and is timed relative to the data on line 166 in the same relative timing relationship as shown in FIGS. 8a and 8b. Thus, the output on line 172 is a $4f_{sc}$ data rate data stream having one sample repeated, with the sample being repeated being a dummy sample that is subsequently ignored and replaced by the output of the digital filter as previously discussed.

The remainder of the circuitry shown in FIG. 7 provides the clock signals on lines 164 and 170 at the proper times to accomplish the proper operation that has been discussed. A single subcarrier frequency signal is applied to exclusive OR gate 176 that is clocked through the latch 162 and applied via line 178 to a one-shot multivibrator 180 which provides a narrow pulse on line 182 that is used to reset a 6-to-1 counter or divider 184 every subcarrier cycle. An oscillator 186 is provided which generates an 86 MHz clock signal on line 188 which is used to clock the 6-to-1 counter or divider 184 as well as a divide by 2 divider 190 and a latch 192. The divide by 2 divider 190 has an output line 194 which clocks a divide by 4 divider 196 which also has an output line 198 that is connected to the D input of the latch 192. The output line 164 is at a frequency of 86 MHz divided by 8 or $3f_{sc}$ (in the NTSC video television format) which provides the clock signal to clock the latches 162. Line 164 is also applied to one input of a phase detector 200, the other of which is supplied by line 202 which is the output of an exclusive OR 204 that has as an input line 206 which carries a component of the $3f_{sc}$ data stream. The phase detector 200 compares the phase of the data stream on line 206 with the latched output of the oscillator 186 and provides an output on lines 208 that are inverted by inverter 210 and applied through an operational amplifier 212 which has output line 214 that controls the phase of the oscillator 186. The phase detector and the associated circuitry are used to properly control the clock signal that is generated on line 164 to the data stream which is applied via line 206 so that the data is latched into the input latches 162 at the appropriate time. The output of the 6-to-1 divider or counter 184 present on line 170 provides the clock signal that is used to clock the data into the latches 168 as previously described.

As previously mentioned, the circuitry that can accomplish the sample dropping is essentially that shown in FIG. 7, but modified so that the clock frequency on line 164 is $4f_{sc}$ and the clock frequency on line 170 is $3f_{sc}$ with the timing of the clocks being controlled so that the circuitry operates in the manner shown in the timing diagram of FIG. 9. To provide the different frequencies on lines 164 and 170, it is only necessary for the divider 196 to be modified to be a 3-to-1 divider rather than a 4-to-1 divider and the counter 184 modified to operate as an 8-to-1 counter or divider rather than as a 6-to-1 counter divider as described with respect to the sample repeater. All other circuit components are identical and will operate as described.

From the foregoing, it should be appreciated that an improved method and apparatus has been illustrated and described for converting a digital data stream of a first data rate to a lower data rate and for subsequently reconstructing the data at the original data rate has been shown and described. The invention has many desirable attributes in the manner in which the conversions are accomplished because multiple generation recording or transmission of the data can be done without proliferating errors of the type that have been produced in prior techniques. In other words, the data that is eventually recorded or received during transmission through an information channel always comprises unaltered samples that are not subject to interpolating errors and it is the unaltered samples that are then used to reconstruct samples that had been previously dropped. Since the same samples are the ones which are always interpolated during multiple generation recording or transmission, errors will not propagate by virtue of the multiple generation. Moreover, when the conversion is specifically performed to convert data from a $4f_{sc}$ data rate to a $3f_{sc}$ rate and then to subsequently regenerate the $4f_{sc}$ data, the conversion can be achieved by using a relatively simple digital filter if the proper conditions are satisfied in the design and implementation of the digital filter.

While certain preferred embodiments have been illustrated and described, various modifications, equivalents and alternatives will become apparent to those skilled in the art. Accordingly, the scope of the present invention should be defined only by the appended claims and equivalents thereof.

Various features of the invention are set forth in the following claims.

What is claimed is:

1. A method of converting a digital data stream of samples of a first data sample rate to a second rate and for subsequently reconstructing said data stream to said first rate, said second rate being less than said first rate, comprising the steps of:

dropping each $n^{th}$ data sample from said data stream of said first rate to obtain said second rate; and reconstructing said digital data stream to its first data sample rate inserting an interpolated data sample where each dropped data sample had been located, said interpolated data sample being generated by a digital filter operating on said data samples of said second rate.

2. A method as defined in claim 1 including the further step of reclocking the remaining samples after dropping each $n^{th}$ data sample to remove spaces where samples had beed dropped in the data stream (where samples had been dropped) of said second rate.

3. A method as defined in claim 2 wherein said digital data stream comprises samples of a color video information signal taken at a rate of four times the color subcarrier frequency and wherein said step of dropping every $n^{th}$ data sample further comprises dropping every fourth one of said samples and reclocking said remaining samples at a uniform and equivalent data rate of three times the color subcarrier frequency.

4. A method as defined in claim 3 wherein the step of reconstructing said digital data stream to said first rate by inserting an interposed sample in each of said locations further comprises summing the products of the sample values of the samples that are three samples removed and on opposite side of the location of the interpolated sample multiplied by the coefficient 5/32, the products of the sample values of the samples that are two samples removed and on opposite sides of the location of the interpolated sample multiplied by the coefficient $-\frac{1}{2}$, and the products of the sample values of the samples that are immediately adjacent and on opposite sides of the location of the interpolated sample multiplied by the coefficient 27/32.

5. A method as defined in claim 4 wherein each of said data samples are multi-bit digital words.

6. A method of reducing the number of digital data samples of a data stream for the purpose of recording and/or transmitting a fewer number of samples and subsequently reconstructing said data stream of said digital data samples comprising the steps of:

dropping data samples from said data stream;

reconstructing said data stream subsequently for transmission and/or recording from said remaining samples by inserting an interpolated sample in each location between adjacent remaining samples where said samples had been dropped, the value of said samples being determined by a finite impulse response digital filter operating on said remaining samples.

7. A method as defined in claim 6 wherein said step of dropping samples comprises dropping every $n^{th}$ sample from said data stream.

8. A method as defined in claim 6 wherein said digital data samples were originally taken at a first sample rate, said method further including the step of reclocking the remaining samples to obtain a lower uniform data rate for recording and/or transmitting.

9. A method as defined in claim 8 wherein said digital data samples are multi-bit digital samples of a color video information signal, said first sample rate being at a rate corresponding to four times the color subcarrier frequency of said video information signal, said second rate corresponding to three times the color subcarrier frequency.

10. A method of effectively reducing the original data rate of a stream of digital samples to a lower data rate for recording or the like and for thereafter reconstructing said data stream to its original data rate from the lower data rate, comprising the steps of:

selectively removing digital samples from said stream and reclocking the remaining samples to remove gaps where samples had been removed;

reconstructing said data stream by generating and inserting an interpolated value in the locations where samples had been removed, said value being generated by using a multi-term finite impulse response digital filter operating on the remaining samples that are located near and on both sides of the location where each sample had been removed.

11. A method as defined in claim 10 wherein the digital samples are of a color video signal, said reconstructing step being accomplished using said multi-term finite impulse response digital filter, said filter having at least three terms and having coefficient multiplying constants such that the response of said digital filter is approximately unity at the chroma subcarrier frequency of said video signal and at zero frequency.

12. A method as defined in claim 11 wherein said step of removing samples comprises removing every fourth sample from said color video signal digital samples, said digital samples having been taken at four times the chroma subcarrier frequency.

13. A method as defined in claim 11 wherein the generating and inserting of an interpolated value in a location during said reconstructing step comprises summing the products of each of the third adjacent samples multiplied by the coefficient 5/32, the products of each of the second adjacent samples multiplied by the coefficient $-\frac{1}{2}$ and each of the first adjacent samples multiplied by the coefficient 27/32.

14. A method as defined in claim 13 wherein each of said data samples comprises an eight bit digital word.

15. For use in a video recording system of the type which takes digital samples of an analog color video input signal at a sample rate of four times the chroma subcarrier frequency thereof, a method of converting the four times subcarrier frequency sample data rate data stream to a three times chroma subcarrier data rate data stream for recording and for thereafter reconstructing the data stream at the four times subcarrier frequency, comprising the steps of:

dropping every fourth sample from said four times subcarrier frequency data stream and reclocking the remaining unaltered samples at an effective three times subcarrier frequency data rate and recording the same on a recording medium;

reproducing said recorded data stream;

applying said reproduced data stream to a multi-term finite impluse response digital filter to generate an interpolated value from the digital samples that are applied thereto and inserting the generated interpolated value into said data stream in locations between data samples where samples had been removed to thereby reconstruct said data stream at said four times subcarrier frequency data rate, the response of said filter being substantially unity at the chroma subcarrier frequency of said video signal and at approximately zero frequency.

16. A method as defined in claim 15 wherein said digital filter generates said interpolated value by summing the products of the sample values of the samples that are there samples removed and on opposite sides of the location of the interpolated sample multiplied by the coefficient 5/32, the products of the sample values of the samples that are two samples removed and on opposite sides of the location of the interpolated sample multiplied by the coefficient $-\frac{1}{2}$, and the products of the sample values of the samples that are immediately adjacent and on opposite sides of the location of the interpolated sample.

17. Apparatus for reconstructing a data stream of digital samples of a color video information signal wherein said samples were taken at a first rate and every $n^{th}$ sample of said data stream has been dropped therefrom, comprising means for reconstructing said data stream at said first rate, said reconstructing means further comprising:

means for generating an interpolated value for each of said dropped samples, said generating means comprising a multi-term finite impulse response digital filter means into which said data stream samples are applied, said filter means operating on said samples and providing an interpolated value at the output thereof and, means connected to said generating means for inserting a generated interpolated value into the data stream at each location where a sample had been dropped.

18. Apparatus as defined in claim 17 wherein said digital filter means comprises a digital filter having at least two terms and a frequency response of approximately unity at least at zero frequency and at the frequency of the chroma subcarrier of said video information signal.

19. Apparatus as defined in claim 18 wherein said digital filter has at least three terms.

20. Apparatus as defined in claim 19 wherein said digital filter includes means for receiving each of said sample values near and on opposite sides of the location where said dropped sample had been located and multiplying coefficient means for multiplying the value of the samples near and on opposite sides of said location and summing means for adding the products of the multiplying coefficients and the sample values to thereby generate said interpolated value.

21. Apparatus as defined in claim 20 wherein said coefficient multiplying means includes a first coefficient multiplier which receives the sample values immediately adjacent said location on both sides thereof and multiplies the sample values by a first coefficient of 27/32, a second coefficient multiplier which receives the sample values that are the two samples removed from said location on both sides thereof and multiplies the sample values by a second coefficient of $-\frac{1}{2}$, a third coefficient multiplier which receives the third adjacent sample from said location on both sides thereof and multiplies the sample values by a third coefficient of 5/32.

22. Apparatus as defined in claim 21 wherein said digital filter means includes a multi-stage shift register means through which said samples are serially shifted, said shift register means having output taps at each stage, said output taps providing the respective sample values and being operably connected to the respective coefficient multipliers, said shift register means having a center tap that is operably connected to said inserting means.

23. Apparatus as defined in claim 22 wherein said inserting means comprises a switching means for receiving and passing either the output from said center tap of said shift register means or the output of said digital filter summing means.

24. Apparatus as defined in claim 23 wherein said digital filter is adapted to receive eight bit digital words and each of said sample values comprises an eight bit digital word.

25. Apparatus as defined in claim 21 wherein said data stream has had every fourth sample dropped and said inserting means includes means for controlling said switching means to pass the output of said summing means whenever said data stream has a dropped sample location at said center tap position of said shift register means.

26. Apparatus for use in reconstructing a data stream of digital samples of a color video information signal taken at a sample rate of four times the chroma subcarrier frequency thereof wherein the data stream had been converted to an effective three times subcarrier data rate data stream by having dropped every fourth sample from said original data stream, comprising:

means for receiving the samples of said effective three times subcarrier data rate data stream and applying the same to a finite impulse response digital filter means, said filter means having a near unity response at zero frequency and at the frequency of the chroma subcarrier, and operating on said samples and generating at the output thereof an interpolated value utilizing the samples near the location where a sample had been dropped;

means associated with said output for inserting an interpolated value from said filter means into said data stream at each location where a sample had been dropped.

27. Apparatus as defined in claim 26 wherein said digital filter means comprises a digital filter having at least two terms and a frequency response of unity at least at zero frequency and at the frequency of the chroma subcarrier of said video information signal.

28. Apparatus as defined in claim 26 wherein said digital filter has at least three terms.

29. Apparatus as defined in claim 28 wherein said digital filter includes means for receiving each of said sample values near and on opposite sides of the location where said dropped sample had been located and multiplying coefficient means for multiplying the value of the samples near and on opposite sides of said location and summing means for adding the products of the multiplying coefficients and the sample values to thereby generate said interpolated value.

* * * * *